United States Patent [19]

Ribouleau

[11] 3,796,346
[45] Mar. 12, 1974

[54] DISTRIBUTING DEVICE FOR A SOWING MACHINE

[75] Inventor: Edmond Ribouleau, Largeasse, France

[73] Assignee: Ateliers Ribouleau, Largeasse, France

[22] Filed: Apr. 12, 1972

[21] Appl. No.: 243,167

[30] Foreign Application Priority Data

Apr. 14, 1971 France .............................. 71.13135
Feb. 29, 1972 France .............................. 7206803

[52] U.S. Cl..................... 221/211, 221/278, 111/77
[51] Int. Cl............................................. B65h 3/14
[58] Field of Search......... 221/211, 278; 111/77, 78

[56] References Cited
UNITED STATES PATENTS

| | | | |
|---|---|---|---|
| 2,605,017 | 7/1952 | Bolen | 221/211 X |
| 3,209,888 | 10/1965 | Sterling | 221/211 X |
| 3,406,869 | 10/1968 | Cordoua | 221/211 X |

Primary Examiner—Stanley H. Tollberg
Assistant Examiner—Joseph J. Rolla
Attorney, Agent, or Firm—Kaufman & Kramer

[57] ABSTRACT

Distributing device for a monoseed sowing machine, the device having a seed distributing wheel which rotates inside a case through a seed container. The wheel has two concentric circles of orifices which define groups of orifices, each group having an orifice on the first of the circles and at least one orifice on the second of the circles. A seed deflecting arm is mounted in a region in which a suction is created to which the orifices are exposed. The arm sweeps across the face of the wheel against which the seeds are retained on the orifices by the effect of the suction. The arm has an edge which extends across the path of the orifices of the second circle and to the path of the orifices of the first circle while leaving at least partly uncovered the orifices of the first circle. The latter orifices are exposed to the suction in a part of said region starting in the vicinity of or in alignment with the deflecting arm whereby a single seed in each group is transferred by the arm to the orifice of the first circle.

15 Claims, 11 Drawing Figures

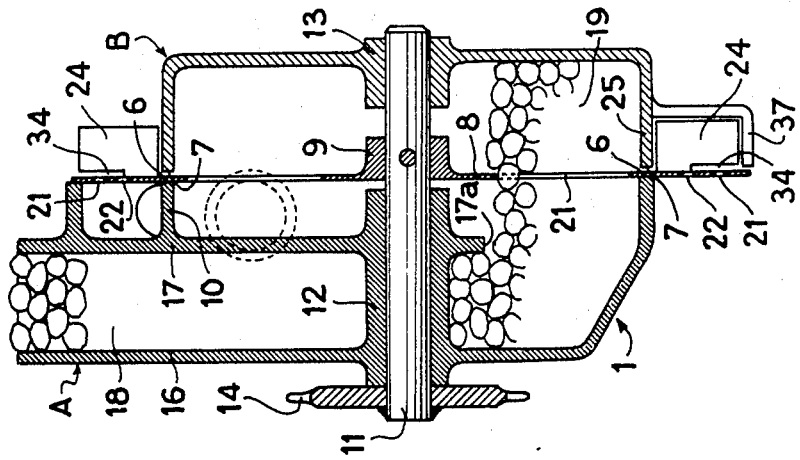
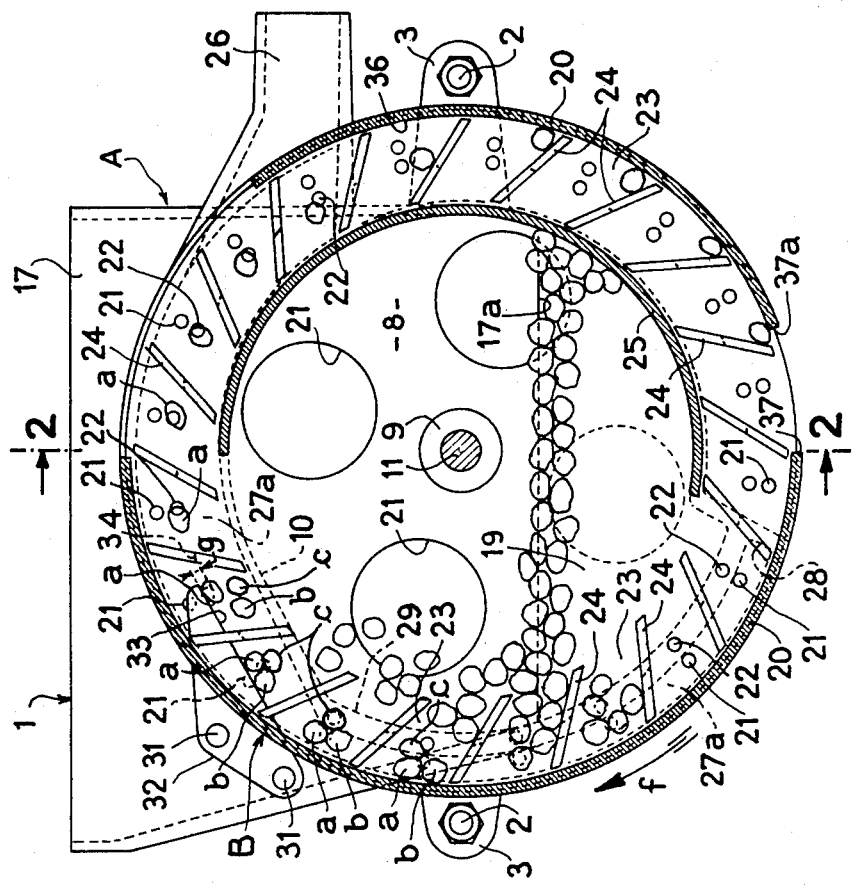

DISTRIBUTING DEVICE FOR A SOWING MACHINE

The present invention relates to a distributing device for a monoseed sowing machine comprising a case which has a part of generally circular shape in which is mounted for rotation about a horizontal axis a distributing wheel provided with circumferentially spaced orifices which are subjected, in at least one region of the annular development of the circular part of the case, to a suction for retaining the seeds which are received from a container of the case and are to be disposed on the ground through a discharge opening in the circular part of the case.

In such a distributing device the orifices are exposed to suction and usually retain a plurality of seeds at a time and constructors have encountered difficulty in eliminating the excess seeds to ensure that the seeds issue one by one from the discharge opening and achieve in as certain a manner as possible an even spacing of the seeds along the ground which is required in numerous applications such as the sowing of seeds of peas, maize or corn etc.

An object of the invention is to solve this problem in a simple and effective manner.

In the distributing device according to the invention, the wheel has the orifices arranged on two concentric circles which define groups of orifices, each group having an orifice of a first of said circles and at least one orifice of a second of said circles, a fixed deflecting arm is provided, in the region in which the suction prevails, and sweeps across the face of the wheel against which the seeds are retained and has a rectilinear or slightly curved edge which extends across the path of the orifices of the second circle and which extends to the path of the orifices of the first circle while leaving at least partly uncovered the orifices of the first circle, the exposure to suction of the orifices of the first circle starting in the vicinity of or in alignment with the deflecting arm whereby a single seed in each group is transferred by the deflecting arm to the orifice of the first circle.

In each group of orifices two orifices may be provided on the second circle but is preferably to reduce each group to a single pair having one orifice on each circle.

Upon the passage of the periphery of the wheel through the container of the case, the orifices of the second circle retain the seeds by suction. The size or calibre of the orifices is such that the number of seeds retained per orifice may vary from one to three. When a single seed is held against an orifice of the second circle this seed is displaced radially when it comes in contact with the deflecting arm and this results in a radial transfer of the seed, retained by an orifice of the second circle, to the orifice of the first circle of the corresponding pair, which orifice is exposed to suction and therefore retains the seed.

When there are two seeds retained by the same orifice of the second circle the leading seed, which is the first to reach the edge of the deflecting arm, is radially deflected and placed directly and entirely on the orifice of the pair which pertains to the first circle and subjected to the attraction of this orifice whereas the second seed, retarded by the transfer of the first, is urged rearwardly and consequently escapes from both the attraction of the orifice of the second circle which passes under the deflecting arm and is therefore closed or masked, and the attraction of the orifice of the first circle already occupied by the first seed. Consequently, the second seed becomes detached and thenceforth in the movement of the pair of seeds a single seed is retained by the orifice of the first circle.

A comparable phenomenon occurs when three seeds are grouped around the same orifice of the second circle. Only the seed which is the first to slide in contact with the deflecting arm is transferred to the orifice of the pair of orifices which pertains to the first circle which ensures that the seed is subsequently moved to the point of discharge. This discharge occurs advantageously at the low point of the circular part of the case.

According to another feature of the invention, the front end of the region of suction, with respect to the direction of rotation, is located at a higher level than that of the discharge opening and cavities are provided for the individual reception of the seeds which are no longer retained by the suction, these cavities being located in radial alignment with the respective groups of orifices and circumferentially defined by strips or fins fixed to the distributing wheel. With this arrangement, the seeds drop to the ground under the effect of the force of gravity and can be spaced along the rows with a precision exceeding that achieved in known machines by cutting off the suction.

In the descent passageway between the front end of the region of suction and the discharge opening the cavities are defined radially by two cylindrical walls of the case. It is preferred that the wall having the larger diameter axially coincide with the edge of the distributing wheel, since it is then possible to cause the cavities to perform in the ascending region the function of capturing the seeds in the container of the case so that when the wheel rotates at high speed there is no risk of an orifice subjected to suction not capturing a seed. This arrangement also permits providing smaller orifices since the seed capturing function is shared between the strips of the cavities and the orifices themselves.

When the distributing device is employed for distributing heavy seeds, such as seeds of maize or corn or haricot beans, and light seeds, such as seeds of beetroots, the suction required for retaining heavy seeds on the orifices does not always permit the unitary distribution of light seeds, since the excess seeds retained on the orifices of the second circle are liable to fail to be eliminated owing to the fact that, even when they have been shifted by the deflecting arm, they remain subjected to a certain attraction.

In order to permit distributing heavy seeds and light seeds indifferently with suction producing means producing a constant, an object of the invention is to provide either of two complementary arrangements.

The first arrangement comprises a conduit which is connected to the region of suction and located on the downstream side of the suction producing means whose outlet orifice leading to the surrounding air is provided with an adjustable closing flap which permits adapting the suction to the required value for the treatment of seeds having different specific weights.

It will be understood that when the flap is completely closed a maximum suction prevails in the suction region, which corresponds to the distribution of heavy seeds, whereas a partial opening decreases the suction to a value permitting the selection and distribution of light seeds one by one.

The second arrangement provided by the invention consists in providing between the first and second circles of orifices an intermediate circle which is concentric with the other circles so as to define groupd of three orifices pertaining to the respective circles, the operative edge of the deflecting arm intersecting the path of the orifices located on the second circle and on the intermediate circle while leaving at least lartially uncovered or unmasked the orifices of the first circle, the exposure to suction of the orifices of the first circle and the orifices of the intermediate circle starting in the vicinity of or in alignment with the deflecting arm.

Trials have shown that the double radial transfer of the seeds initially carried by the orifices of the second circle under the effect of the deflecting arm ensures an effective elimination of the excess seeds whether the seeds be heavy or light with a suction value which is invariable.

Further features and advantages of the invention will be apparent from the ensuing description with reference to the accompanying drawings.

In the drawings :

FIG. 1 is a cross-sectional view of a seed distributing device;

FIG. 2 is a cross-sectional view taken on line 2—2 of FIG. 1;

Figure 3:
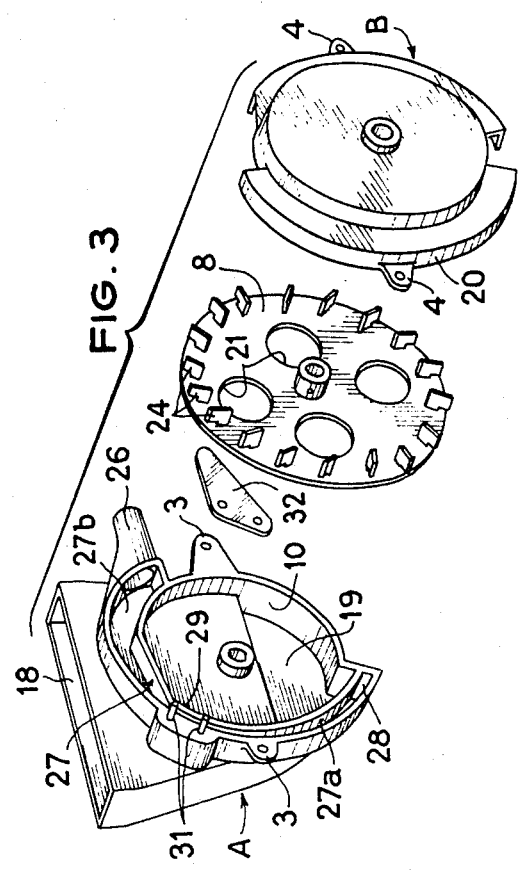
FIG. 3 is an exploded perspective view of the distributing device shown in FIG. 1.

The distributing device shown in FIGS. 1–3 comprises a case 1 having two parts A, B the first part A constituting a body to which the other part B, constituting a generally circular-shaped cover, is connected by bolts 2 extending through coinciding lugs 3, 4 formed on the respective parts of the case. The adjacent end faces 6, 7 of the body A and cover B define an axial clearance in which is inserted a distributing wheel or disc 8 in sliding contact with the end faces, the hub 9 of the disc being fixed to a shaft 11 which is journalled in cylindrical bearings 12, 13 respectively formed in the body A and cover B. The shaft is driven through the agency of a chain sprocket wheel 14 or other means.

Starting from the bearing 12 of the body, two parallel plane faces 16, 17 extend principally upwardly and define in the body A, on the side opposed to the cover B, a passageway 18 which is supplied with seeds from a hopper (not shown) and the lower end of which opens into the bottom of the case and constitutes a seed container 19 which extends on each side of the distributing disc 8 owing to the axial communication with the cover B by way of openings 21a formed in the disc 8. The level of the seeds in the container is defined by the lower end edge 17a of the plane inner face of the seed passageway 18.

The distributing disc 8 has in the vicinity of its periphery two concentric circles of orifices 21, 22, which orifices are circumferentially evenly spaced apart in each circle and disposed in such manner as to form pairs of orifices in each pair of which the orifices pertaining to the respective circles are located on the same radius of the disc. Moreover, each pair of orifices occupies a median position in a compartment or cavity 23 defined by two consecutive strips or fins of a series of strips or fins 24 which are evenly spaced apart on the face of the disc 8 facing the cover B and have certain obliquity with respect to a radius of the disc.

In order that the orifices 21, 22 be subjected to suction whereby they are able to retain, under conditions explained hereinafter, the seeds taken from the container 19, the body A is provided with a pipe 26 adapted to be connected to a source of suction and which communicates with a passageway of conduit 27 provided radially outside the wall 10 which defines the space subjected to atmospheric pressure in which the seeds travel. This passageway 27 is axially closed by the sliding contact of the adjacent face of the distributing disc 8 and extends circumferentially from a low point of first end 28 (with respect to the direction of rotation of the disc 8) located a little beyond a vertical plane through the shaft 11, with respect to the direction of rotation $f$ of the disc, to a last end (with respect to the direction of rotation of the disc 8) corresponding to the pipe 26 which opens into the passageway 27 at a point located in a radial plane at about 45° to the vertical plane through the shaft 11.

On the major part of the length of its ascending part 27a starting from the low point 28, the passageway is relatively narrow so as to coincide with the orifices 21 of the circle of large diameter while leaving the orifices 22 free of any suction. This narrow part 27a extends to a point 29 beyond which the passageway diverged and has a crescent-like shape 27b and leads to the pipe 26 and along which the orifices 21, 22 pertaining to the two circles are subjected to suction.

In the vicinity of the point 29 of the passageway 27, the body A has two pins 31 which serve to fix a deflecting arm 32 constituted by a triangular plate of which one of the free edges, 33, is both rectilinear and smooth and constitutes a secant with respect to the periphery of the disc 8 and is oriented in the direction of rotation of the latter. The rectilinear edge 33 intersects the path travelled through by the orifices 21 of the circle of large radius and its end opposed to the fixing pins 31 is plush with or hardly covers the edge of the orifices 22 of the circle of small radius remote from the centre of the disc 8 when these orifices travel in the region of the deflecting arm 32.

The edge of each strip 24 adjacent the disc 8 has a notch 34 allowing the passage of the deflecting arm 32.

When the disc 8 rotates, the cavities 23, defined by the strips 24 which extend to the large-radius cylindrical peripheral wall 20 of the cover B, receive under the effect of the force of gravity a certain quantity of seeds contained in the container 19 and raise these seeds, the major part of which falls owing to the change in the orientation of the cavities, the orifices exposed to depression 21 retaining either a single seed held against the orifice or two or three seeds grouped around the orifice.

In the embodiment shown in FIG. 1, it has been assumed that two or three seeds have been attracted and retained by an orifice 21 above the horizontal diameter of the disc. In the case of two seeds $a$, $b$, at the moment the corresponding cavity 23 passes across the front of the deflecting arm 32, the seed $a$ which is the first to engage the oblique edge 33 slides upon contact therewith and is followed by the seed $b$ also in contact with the edge 33 and still retained by the attraction exerted by the orifice 21. When the cavity reaches the end part of the edge 33, the first seed $a$ has been shifted radially and is placed entirely against the orifice 22 of the inner circle while the edge 33 has pushed away the second seed $b$ whose progression along the edge 33 was retarded by the transfer of the seed $a$. The seed $b$ drops, as it has ceased to be subjected to the attraction of the orifice 21 which is closed by the arm 33. In the event that a third seed $c$ is carried along by the orifice 21, the behaviour of the first two seeds $a$ and $b$ in contact with the arm 32 remains that described hereinbefore. Aligned on the oblique edge 33, they push the third seed $c$ radially which at one moment is subjected to the attraction of the orifice 22 of the inner circle, which is exposed to the suction in this region, before dropping, it having been pushed away by the seed $a$ toward the end part of the edge 33. After passing by the deflecting arm 32, a single seed $a$, which has, as it were, changed orbit, is therefore retained by the orifice 22 of the inner circle. Upon passing beyond the front end, located in the region of the suction pipe 26 of the part 27b of the suction passageway, the suction ceases and the seed, which is no longer applied against the orifice 22, drops under the effect of gravity onto the lower strip 24 of the cavity and starts to descend inside a descent passageway 36 defined by the cylindrical face of the large radius peripheral wall 20 and a cylindrical face of the inner peripheral wall 25 of smaller radius and concentric with the wall 20 which partly defines the seed container 19. The seed falls into the ground in the lower part of the passageway 36 where the outer cylindrical wall 20 of the cover is interrupted and forms a discharge opening 37 whose rear edge 37a is adjacent a region of the cylindrical wall 20 having a distinct slope, so that, when it falls, the seed is applied against the forward strip of the cavity and falls exactly at the instant when the rear edge 37a of the discharge opening 37 is passed through. In this way a very precise localisation of the seeds is possible.

Figure 4:
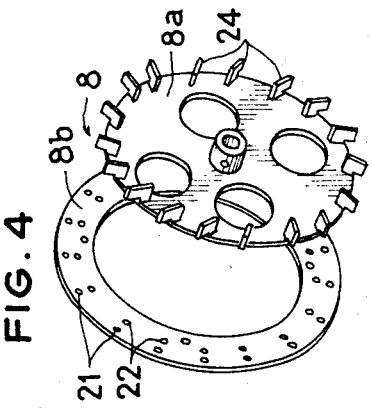
FIG. 4 is a perspective view of a modification of the distributing wheel.

FIG. 4 shows a modification of the distributing disc 8 which has, instead of a single member as shown in FIG. 3, two members one of which is a web 8a provided on its periphery with strips or fins 24 the other of which is a ring 8b which has two circles of orifices 21, 22 and is fixed to the web 8a by bolting. The advantage of this arrangement is that it permits choosing for each type of seed a ring 8b adapted to the nature and size of the seed to be distributed.

Figure 5:
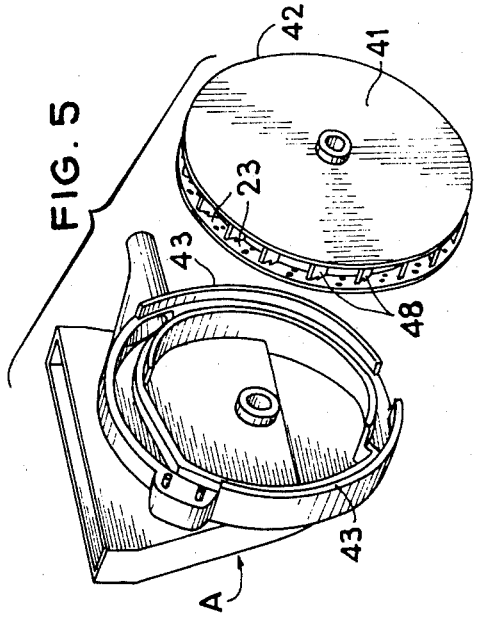
FIG. 5 is an exploded perspective view of another embodiment of the distributing device.

FIG. 5 shows a modification of the distributing device in which the cover B is eliminated, the space inside the case being closed by the web 41 of a distributing wheel 42 which replaces the flat disc 8 shown in FIGS. 1–4. Disposed adjacent the periphery of the web 41 and on its inner face, are cavities 23 which pass inside a cylindrical wall 43 formed on the body A and replacing the cylindrical wall 20 of the embodiment shown in FIG. 1.

Figure 6:
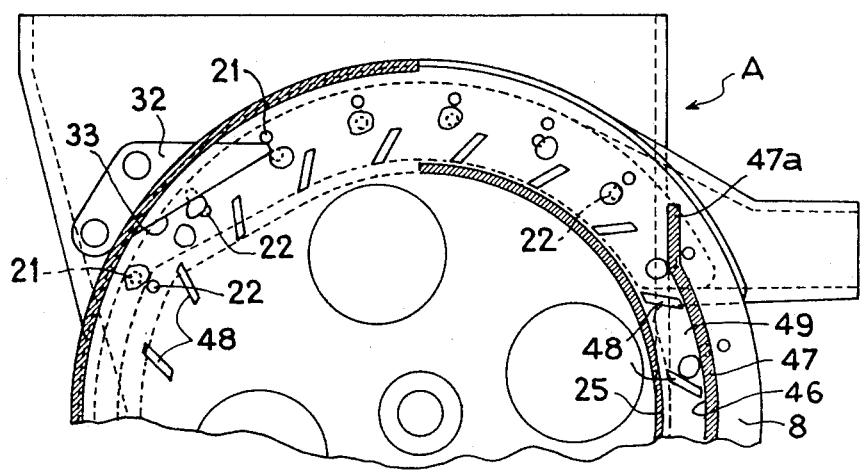
FIG. 6 is a partial semi-sectional view of another embodiment of the distributing device whose distributing wheel has short strips.

In FIG. 6 the descent passageway 46 for the seeds is narrower than in the embodiment shown in FIG. 1, it being defined by the inner cylindrical wall 25 of the cover and by an outer wall 47 disposed at a radial distance inwardly of the edge of the distributing disc 8. The upper portion 47a of the wall 47 extends vertically so as to allow the seeds to be engaged in the cavities 49 and, as the case may be, detach them from the orifice 22 exposed to the suction. The strips or fins 48 defining the cavities 49 are correspondingly shorter than in the embodiment shown in FIGS. 1 and 2 so that the ascending part of the motion of the cavities, the strips do not contribute to the retention of the seeds which is ensured merely by the suction in the orifices 21 of the outer circle or orifices. The deflecting arm 32 remains radially outside the strips 48 so that it is not necessarily in the form of a thin plate as in the foregoing embodiments.

The cavities 21, 22 of each pair could be slightly offset circumferentially. Instead of a pair of cavities, there could be provided groups of three cavities comprising a cavity 22 located on the inner circle and two cavities 21 of smaller size located side-by-side on the outer circle.

The size or calibre of the suction orifices 21, 22 is determined in accordance with the nature and size of the seeds to be distributed. It will be observed that the distance $g$ between the end of the leading edge 33 of the deflecting arm 32 and the point of the orifice 22 which is the nearest to the axis of the distributor can be considered as independent of the size of the seeds and its magnitude can advantageously be equal to ¾ of the diameter of the orifice 22.

Figure 7:
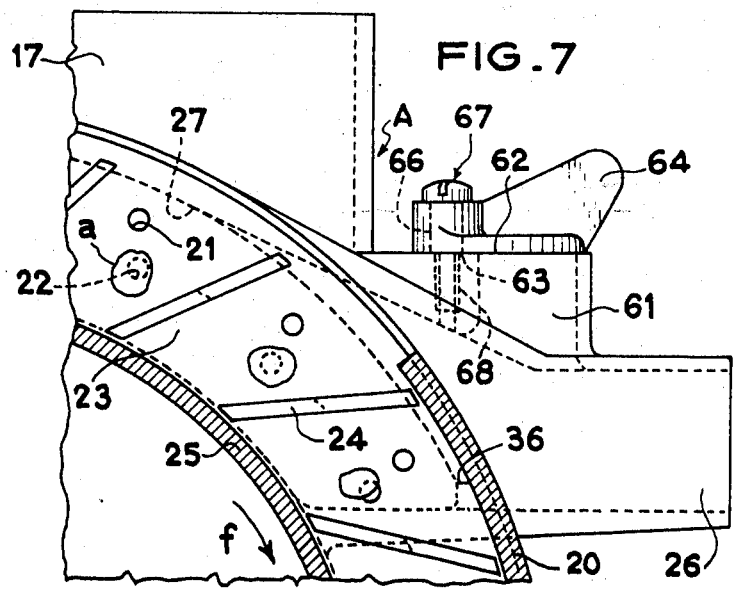
FIG. 7 is a partial cross-sectional view of a conduit having a variable opening for regulating the depression.

In FIG. 7, the pipe 26 supplying air under suction is provided with a conduit 61 of which the upper end defines a plane face 62 and opens to the exterior by way of an orifice 63 which may be closed by an orientable flap 64. The latter is mounted to pivot about a journal 66 formed on a screw 67 which is screwthreadedly engaged in a lateral aperture 68 adjacent the passageway.

Figure 8:
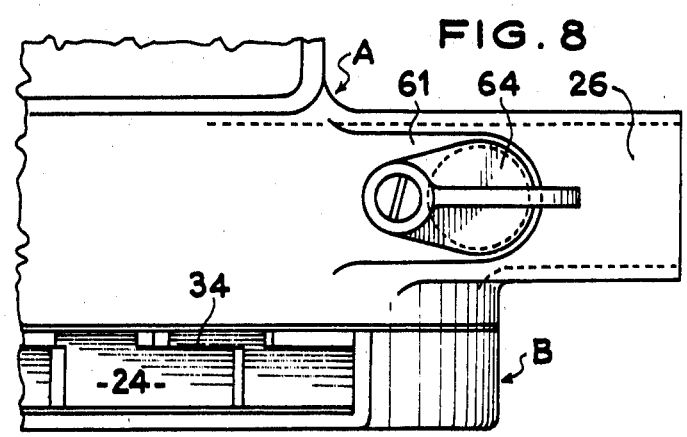
FIG. 8 is a plan view of the passageway shown in FIG. 7 with the conduit closed.
Figure 9:
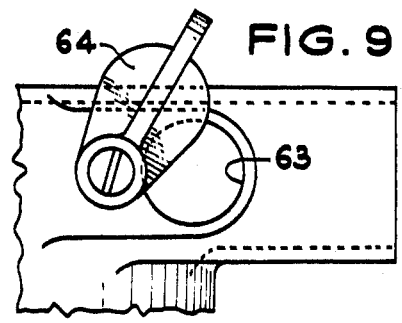
FIG. 9 shows the conduit in partially-opened position.

When the flap 64 is in its closing position as shown in FIG. 8, the suction prevailing in the passageway 27 is that which is produced by the suction producing means (not shown). On the other hand, when the flap 64 is partly opened as shown in FIG. 9, there is produced downstream of the conduit and consequently in the passageway 27, a reduction in the suction so that the attraction exerted in the orifices 21, 22 of the respective circles is itself reduced so that it is possible to select and distribute one-by-one light seeds, for example of beetroots, whereas the total suction provided for the treatment of heavy seeds, for example of maize or corn, would render the deflecting arm 32 inoperative for light seeds.

Figure 10:
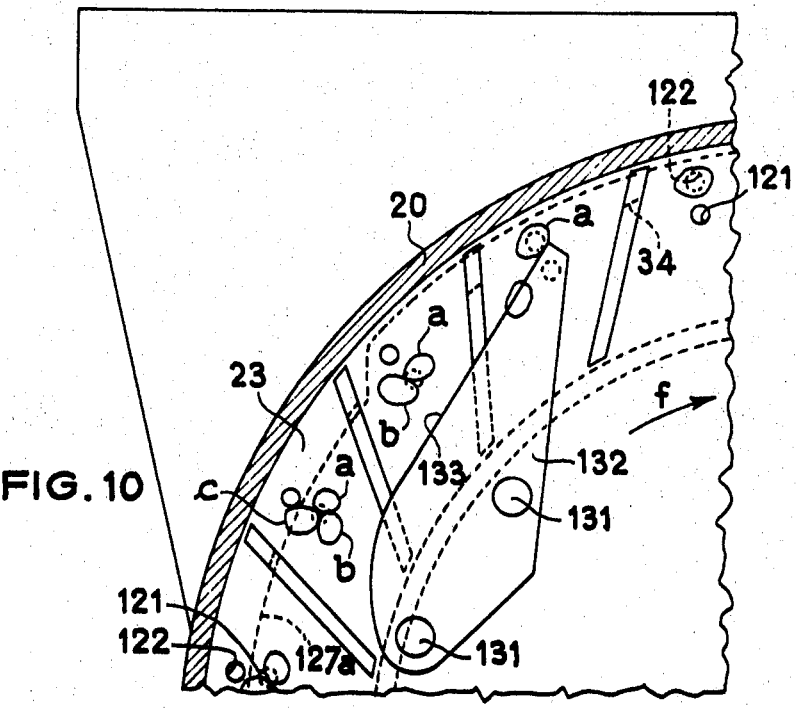
FIG. 10 is a partial cross-sectional view of a modification of the device shown in FIG. 1.

In FIG. 10, the relative position of the orifices of the two circles has been reversed with respect to the arrangement shown in FIGS. 1–7. The orifices 121 of the inner circle are subjected to a suction in the passageway 127a starting from the lower end of this suction passageway, the orifices 122 of the outer circles being in turn subjected to the suction owing to the widening of the part 127a of the passageway in the region of the deflecting arm 132 which is mounted on the cover B by means of pins 131 and whose active edge 133 has, with respect to the direction $f$ of rotation of the distributing disc 8, an outward obliquity so that it intersects the path of the orifices 121 of the inner circle, its front end slightly masking the orifices 132 of the outer circle. The deflecting arm 132 operated in an identical manner to the deflecting arm 32 shown in FIGS. 1–3.

Figure 11:
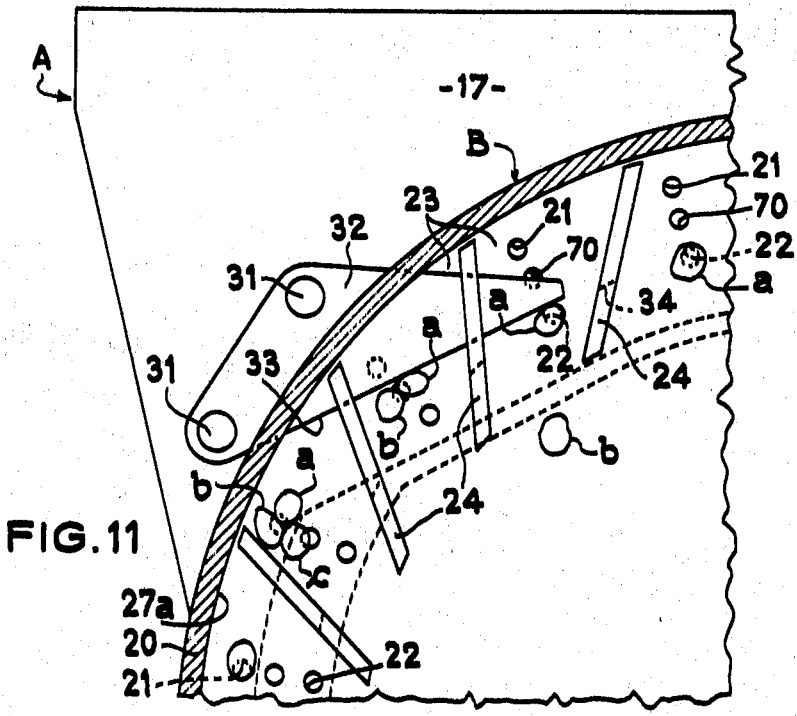
FIG. 11 is a partial cross-sectional view of another modification of the device shown in FIG. 1 in which there are provided three concentric circles of seed-retaining or seed-transferring orifices.

In FIG. 11, the inner circle of orifices 22 and outer circle of orifices 21 are arranged as in FIGS. 1–7 but there is provided an intermediate circle of orifices 70 concentric with the two other circles of orifices, so that there are in each of the cavities 23 a group of three orifices disposed radially in alignment. The operative edge 33 of the deflecting arm 32 passes through the path of the orifices 21 of the outer circle and the orifices 70 of the intermediate circle, its front end slightly masking the orifices 22 of the inner circle.

The seeds which are grouped around the orifices 21 of the outer circle under the effect of the suction prevailing in the part 27a of the passageway 27, are subjected, as in the arrangement show in FIGS. 1–10, to the action of the deflecting arm 32. When it concerns heavy seeds, the radial transfer effected by the edge 33 of the arm 32 allows only a single seed to be retained by the orifices 70 of the intermediate circle. However, when the seeds are light, the action of the deflecting arm 32 may be insufficient to eliminate, in the course of the transfer from the outer circle to the intermediate circle, all the excess seeds so that in the cavities 23 two seeds *a*, *b* are for example retained in front of the orifices 70. It is only in the course of the second transfer from the intermediate circle to the inner circle that the excess seed *b* which is subjected once more to the radial thrust of the edge 33 and to the retarding action of the seed *a* and to a large extent escapes from the attraction exerted by the orifices 70 and 22, becomes detached and falls away and leaves only a single seed *a* in front of the orifice 22.

It must be understood that it is possible to combine the two arrangements shown respectively in FIGS. 7–9 and FIG. 11, that is to say, to provide a distributing device whose wheel has three circles of orifices and whose suction pipe 26 is provided with the conduit 61.

Having now described my invention what I claim as new and desire to secure by Letters Patent is:

1. A distributing device for a monoseed sowing machine, the device comprising means defining a case, means defining a distributing wheel mounted to rotate in the case about a substantially horizontal axis, the wheel having a first annular surface and a second annular surface axially opposed to the first surface, means for rotating the wheel, means defining in the wheel circumferentially spaced first throughway orifices arranged on a first circle and circumferentially spaced second throughway orifices arranged on a second circle concentric with the first circle, the first orifices travelling in a first circular path and the second orifices travelling in a second circular path as the wheel rotates, means defining a container for seeds communicating with said first annular surface of the wheel, passage means for producing suction, the passage means extending circumferentially of the wheel in adjoining relation to said second surface of the wheel and communicating with some of the orifices for holding seeds against said first annular surface of the wheel in regions of said some orifices, a deflecting arm mounted on the case and having an edge extending completely across said second path toward said first path while being set back from said first circle, the deflecting arm being cooperative with said first annular surface of the wheel to shift seeds completely away from and substantially mask each successive one of said second orifices as the second orifice passes beyond the deflecting arm edge while the deflecting arm leaves each successive one of the first orifices substantially unmasked and allows one seed to be retained by each successive one of the first orifices, said passage means having a first end and a second end respectively constituting a beginning and end of the passage means respectively located upstream and downstream of the edge of the deflecting arm with respect to the direction of movement of the orifices and comprising a first passage portion extending from said first end circumferentially of the wheel alongside said second circle of second orifices and sufficiently beyond the edge of the deflecting arm to expose to suction a plurality of successive second orifices including a second orifice which is located beyond the edge of the deflecting arm and is masked by the deflecting arm, and a second passage portion extending circumferentially from said last end alongside said first circle of first orifices and terminating sufficiently beyond a radial plane containing the intersection of the edge of the deflecting arm with said first circle in the upstream direction relative to the direction of movement of the orifices to expose to suction a plurality of first orifices and enable a seed released from each second orifice masked by the deflecting arm to become attracted to and retained by each first orifice, means for masking from suction first orifices upstream of said termination of the second passage portion with respect to the direction of movement of the orifices, seed receiving and discharging means combined with said first annular surface of the wheel for receiving each seed as it is released from its corresponding first orifice and discharging the seed from the wheel.

2. A device as claimed in claim 1, wherein the first orifices and second orifices are grouped in pairs in which pairs the first and second orifices are substantially in radial alignment.

3. A device as claimed in claim 1, wherein the case defines a discharge opening and said last end of the passage means is located above the discharge opening and there are provided means defining with said first surface of the wheel cavities which have radially outer and inner openings and are respectively for the reception of seed released from the corresponding first orifice, each of the cavities being respectively substantially in radial alignment with and fixed in position with respect to a plurality of orifices comprising a first orifice and a second orifice whereby each released seed is capable of falling from its corresponding cavity through the caivty outer opening and being discharged from the case by way of the discharge opening during rotation of the wheel .

4. A device as claimed in claim 3, wherein strips carried by the distributing wheel and means defining an arcuate passage containing the strips define the cavities with said second surface of the wheel.

5. A device as claimed in claim 4, wherein the distributing wheel is constituted by a disc and the container is located axially on both sides of the disc, openings being provided in the disc for the passage of seeds from one side of the disc to the other.

6. A device as claimed in claim 3, the case comprising an inner arcuate wall which closes the inner openings of the cavities and an outer arcuate wall which closes said outer openings of the cavities between said last end of the passage means and the discharge opening, the outer arcuate wall defining the discharge opening and defining with the inner arcuate wall a seed descent passageway leading to the discharge opening.

7. The device as claimed in claim 6, comprising strip portions carried by the wheel and extending axially from said first surface of the wheel and means defining a wall in each cavity axially spaced from said first surface of the wheel and in contact with the strip portions, each of the cavities being defined by said first surface of the wheel, two of said strip portions and said wall axially spaced from said first surface of the wheel.

8. A device as claimed in claim 7, wherein the outer arcuate wall has an inside radius less than the radius of the periphery of the distributing wheel, the strip portions being correspondingly radially set back from the periphery of the wheel.

9. A device as claimed in claim 7, wherein the outer arcuate wall substantially coincides with the periphery of the distributing wheel, an extension portion closing said outer openings of the cavities extending the outer arcuate wall beyond the discharge opening with respect to the direction of rotation of the wheel whereby in the lower part of the container the cavities capture the seeds via said inner openings and the extension portion retains the captured seeds in the cavities.

10. A device as claimed in claim 1, wherein the edge of the deflecting arm is smooth.

11. A device as claimed in claim 1, wherein a part of the distributing wheel defining the first orifices and second orifices constitutes a removable ring.

12. A device as claimed in claim 1, wherein the first circle of first orifices is located inside the second circle and the deflecting arm is mounted on the case outside the second circle.

13. A device as claimed in claim 1, wherein the first circle of first orifices is located outside the second circle, and the deflecting arm is mounted on the case inside the second circle.

14. A device as claimed in claim 1, comprising an inlet pipe communicating with the passage means and for connection to a device generating a suction, a conduit interposed between the inlet pipe and the passage means and communicating with the exterior of the distributing device and an adjustable closing flap on the conduit whereby it is possible to selectively connect the passage means to the atmosphere, so as to reduce the suction and isolate the passage means from the atmosphere so as to maintain the suction in the passage means at a value determined by the suction generating device.

15. A device as claimed in claim 1, comprising between the first circle of first orifices and the second circle of second orifices an intermediate circle of third orifices which travel in a third circular path thereby defining groups of at least three orifices pertaining to the respective circles of orifices, the deflecting arm intersecting the second path of the second orifices and the third path of the third orifices while leaving at least partially unmasked the first orifices, the second passage portion of the passage means being radially wide enough to expose to the suction both the first orifices and the third orifices between said last end and said termination of the second passage portion.

* * * * *

FO-1050
(5/69)

UNITED STATES PATENT OFFICE
CERTIFICATE OF CORRECTION

Patent No. 3,796,346                     Dated March 12, 1974

Inventor(s) Edmond Ribouleau

It is certified that error appears in the above-identified patent and that said Letters Patent are hereby corrected as shown below:

In column 2, line 53: After the word "constant" insert the word -- suction --

In column 3, line 4: The word "groupd" is misspelled and should be -- groups --

In column 3, line 8: The word "lartially" is misspelled and should be -- partially --

In column 4, line 23: The word "of" should be changed to -- or --

In column 5, line 50: The word "localisation" is misspelled and should be --localization --

In column 7, line 3: The word "operated" should be changed to -- operates --

In column 7, line 18: The word "show" should be changed to -- shown --

Signed and sealed this 1st day of October 1974.

(SEAL)
Attest:

McCOY M. GIBSON JR.
Attesting Officer

C. MARSHALL DANN
Commissioner of Patents